United States Patent
Park et al.

(10) Patent No.: US 10,862,531 B2
(45) Date of Patent: Dec. 8, 2020

(54) METHOD AND DEVICE FOR TRANSMISSION AND RECEPTION OF PHYSICAL UPLINK CONTROL CHANNEL WIRELESS COMMUNICATION SYSTEM

(71) Applicant: LG Electronics Inc., Seoul (KR)

(72) Inventors: Hanjun Park, Seoul (KR); Suckchel Yang, Seoul (KR); Joonkui Ahn, Seoul (KR); Jaehyung Kim, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/425,323

(22) Filed: May 29, 2019

(65) Prior Publication Data

US 2019/0280734 A1 Sep. 12, 2019

Related U.S. Application Data

(63) Continuation of application No. PCT/KR2018/006852, filed on Jun. 18, 2018.

(60) Provisional application No. 62/586,916, filed on Nov. 16, 2017, provisional application No. 62/556,494, filed on Sep. 10, 2017, provisional application No. (Continued)

(30) Foreign Application Priority Data

Jun. 18, 2018 (KR) .......................... 10-2018-0069500

(51) Int. Cl.
*H04B 1/7143* (2011.01)
*H04W 72/04* (2009.01)

(52) U.S. Cl.
CPC ...... *H04B 1/7143* (2013.01); *H04W 72/0413* (2013.01); *H04B 2201/698* (2013.01)

(58) Field of Classification Search
CPC .......................... H04B 1/7143; H04W 72/0413
See application file for complete search history.

(56) References Cited

U.S. PATENT DOCUMENTS

2008/0298433 A1* 12/2008 Tiirola ............... H04J 13/0062
375/132
2009/0046645 A1* 2/2009 Bertrand ............. H04L 27/2613
370/329

(Continued)

FOREIGN PATENT DOCUMENTS

JP 2011524658 9/2011
KR 1020080095913 10/2008

(Continued)

OTHER PUBLICATIONS

U.S. Appl. No. 62/453,984, filed Feb. 2017, Yin et al.*

(Continued)

*Primary Examiner* — Jael M Ulysse
(74) *Attorney, Agent, or Firm* — Fish & Richardson P.C.

(57) ABSTRACT

The present invention relates to a method for transmitting a physical uplink control channel, the method comprising: determining a sequence hopping pattern on the basis of a frequency hopping index determined based on whether or not frequency hopping is configured in a slot; and transmitting a first PUCCH including a demodulation reference signal to which the determined sequence hopping pattern is applied, or a second PUCCH to which the determined sequence hopping pattern is applied.

12 Claims, 14 Drawing Sheets

Related U.S. Application Data

62/543,969, filed on Aug. 11, 2017, provisional application No. 62/520,685, filed on Jun. 16, 2017.

(56) References Cited

U.S. PATENT DOCUMENTS

| | | | | |
|---|---|---|---|---|
| 2009/0092148 | A1* | 4/2009 | Zhang | H04L 5/0055 370/458 |
| 2009/0196229 | A1* | 8/2009 | Shen | H04B 1/69 370/328 |
| 2011/0126071 | A1* | 5/2011 | Han | H04L 5/0053 714/749 |
| 2011/0142000 | A1* | 6/2011 | Han | H04L 5/0007 370/329 |
| 2011/0206089 | A1* | 8/2011 | Cho | H04L 5/0016 375/141 |
| 2011/0243191 | A1* | 10/2011 | Nakao | H04B 1/7143 375/133 |
| 2011/0286436 | A1* | 11/2011 | Suzuki | H04L 1/1692 370/336 |
| 2012/0051313 | A1* | 3/2012 | Seo | H04L 5/003 370/329 |
| 2012/0099545 | A1* | 4/2012 | Han | H04L 1/0028 370/329 |
| 2012/0113910 | A1* | 5/2012 | Jen | H04L 1/1854 370/329 |
| 2012/0163159 | A1* | 6/2012 | Luo | H04L 5/0062 370/210 |
| 2012/0201275 | A1* | 8/2012 | Tiirola | H04J 13/0062 375/135 |
| 2012/0269138 | A1* | 10/2012 | Han | H04L 1/0073 370/329 |
| 2013/0044581 | A1* | 2/2013 | Cho | H04L 1/1607 370/209 |
| 2013/0156003 | A1* | 6/2013 | Liang | H04L 1/1671 370/330 |
| 2013/0163534 | A1* | 6/2013 | Anderson | H04L 1/0026 370/329 |
| 2013/0170462 | A1* | 7/2013 | Seo | H04L 5/0053 370/329 |
| 2013/0301452 | A1* | 11/2013 | Yoon | H04J 13/0074 370/252 |
| 2014/0241295 | A1* | 8/2014 | Tang | H04L 1/0029 370/329 |
| 2014/0376356 | A1* | 12/2014 | Park | H04W 72/0413 370/203 |
| 2015/0055618 | A1* | 2/2015 | Takaoka | H04B 1/713 370/330 |
| 2016/0277065 | A1* | 9/2016 | Xie | H04L 5/0051 |
| 2016/0352446 | A1* | 12/2016 | Nakao | H04W 72/042 |
| 2017/0033843 | A1* | 2/2017 | Wang | H04W 28/0215 |
| 2018/0124815 | A1* | 5/2018 | Papasakellariou | H04L 1/1861 |
| 2018/0220414 | A1* | 8/2018 | Yin | H04W 72/0413 |

FOREIGN PATENT DOCUMENTS

| | | |
|---|---|---|
| KR | 1020110081106 | 7/2011 |
| KR | 20130132222 | 12/2013 |
| KR | 1020140044393 | 4/2014 |
| KR | 1020140080376 | 6/2014 |
| KR | 1020150013757 | 2/2015 |
| KR | 1020150090425 | 8/2015 |
| KR | 1020170048416 | 5/2017 |
| WO | WO2010137341 | 11/2012 |

OTHER PUBLICATIONS

Intel Corporation, "UL control channel design with long duration," R1-1700368, 3GPP TSG RAN WG1 NR Ad-Hoc Meeting, Spokane, USA, Jan. 16-20, 2017, 5 pages.

Korean Notice of Allowance in Korean Patent Application No. 10-2018-0069500, dated Jan. 30, 2019, 3 pages (with English translation).

Intel Corporation, "Time and frequency domain resource allocation for long PUCCH", R1-1707396, 3GPP TSG RAN WG1 Meeting #89, Hangzhou, P. R. China, May 15-19, 2017, 5 pages.

Nokia, Alcatel-Lucent Shanghai Bell, "On the design of long PUCCH for NR", R1-1708512, 3GPP TSG RAN WG1#89, Hangzhou, P.R. China, May 15-19, 2017, 4 pages.

Ericsson, "Introduction of Rel-13 eCA," R1-157912, 3GPP TSG-RAN WG1 Meeting #83, 3GPP TSG-RAN WG1 Meeting #83, dated Nov. 15-22, 2015, 20 pages.

Japanese Office Action in Japanese Application No. 2019-533612, dated Jan. 14, 2020, 5 pages (with English translation).

NTT Docomo, Inc, "Views on sPUCCH design," R1-1708418, 3GPP TSG RAN WG1 Meeting #89, Hangzhou, P.R. China, dated May 15-19, 2017, 9 pages.

Zte, "sPUCCH resource management" R1-1707280, 3GPP TSG RAN WG1 Meeting #89, Hangzhou, P.R. China, dated May 15-19, 2017, 7 pages.

\* cited by examiner

METHOD AND DEVICE FOR TRANSMISSION AND RECEPTION OF PHYSICAL UPLINK CONTROL CHANNEL WIRELESS COMMUNICATION SYSTEM

CROSS-REFERENCE TO RELATED APPLICATIONS

This application is a continuation of International Application No. PCT/KR2018/006852, filed on Jun. 18, 2018, which claims the benefit of Korean Application No. 10-2018-0069500, filed on Jun. 18, 2018, U.S. Provisional Application No. 62/586,916, filed on Nov. 16, 2017, U.S. Provisional Application No. 62/556,494, filed on Sep. 10, 2017, U.S. Provisional Application No. 62/543,969, filed on Aug. 11, 2017, and U.S. Provisional Application No. 62/520,685, filed on Jun. 16, 2017. The disclosures of the prior applications are incorporated by reference in their entirety.

TECHNICAL FIELD

The present disclosure relates to a wireless communication system, and more particularly to, methods for transmitting and receiving a physical uplink control channel between a terminal and a base station in a wireless communication system and apparatuses for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity for the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

The object of the present disclosure is to provide methods of transmitting and receiving a physical uplink control channel between a terminal and a base station in a wireless communication system and apparatuses for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides methods of transmitting and receiving a physical uplink control channel between a terminal and a base station in a wireless communication system and apparatuses for supporting the same.

In an aspect of the present disclosure, provided is a method of transmitting a Physical Uplink Control Channel (PUCCH) to a base station by a user equipment (UE) in a wireless communication system. The method may include: determining a sequence hopping pattern based on frequency hop index determined depending on whether frequency hopping is configured in a slot; and transmitting a first PUCCH including a Demodulation Reference Signal (DM-RS) to which the determined sequence hopping pattern is applied or a second PUCCH to which the determined sequence hopping pattern is applied.

For example, when the frequency hopping is configured in the one slot, the frequency hop index may be sequentially numbered from 0 to N (where N is a natural number) for hops in the slot.

As another example, when the frequency hopping is not configured in the slot, the frequency hop index may correspond to 0.

The sequence hopping pattern may be determined based on a combination of a sequence group hopping pattern for selecting one sequence group from among a plurality of sequence groups and a base sequence hopping pattern for selecting one base sequence from among a plurality of base sequences in a specific sequence group.

In addition, the sequence hopping pattern may be determined based on a slot index in addition to the frequency hopping index.

In another aspect of the present disclosure, provided is a method of receiving a Physical Uplink Control Channel (PUCCH) from the UE by a base station in a wireless communication system. The method may include: receiving, from the UE, a first PUCCH including a Demodulation Reference Signal (DM-RS) to which a specific sequence hopping pattern is applied or a second PUCCH to which the specific sequence hopping pattern is applied. The specific sequence hopping pattern may be determined based on frequency hop index determined depending on whether frequency hopping is configured in a slot.

For example, when the frequency hopping is configured in one slot, the frequency hop index may be sequentially numbered from 0 to N (where N is a natural number) for hops in the slot.

As another example, when the frequency hopping is not configured in the slot, the frequency hop index may correspond to 0.

The sequence hopping pattern may be determined based on a combination of a sequence group hopping pattern for selecting one sequence group from among a plurality of sequence groups and a base sequence hopping pattern for selecting one base sequence from among a plurality of base sequences in a specific sequence group.

In addition, the sequence hopping pattern may be determined based on a slot index in addition to the frequency hopping index.

In this case, the base station may transmit, to the UE, configuration information indicating whether the frequency hopping is configured in the slot.

In still another aspect of the present disclosure, provided is a UE for transmitting a Physical Uplink Control Channel (PUCCH) to a base station in a wireless communication system. The UE may include: a receiver; a transmitter; and a processor connected to the receiver and the transmitter. The processor may be configured to: determine a sequence hopping pattern based on frequency hop index determined depending on whether frequency hopping is configured in a slot; and transmit a first PUCCH including a Demodulation Reference Signal (DM-RS) to which the determined sequence hopping pattern is applied or a second PUCCH to which the determined sequence hopping pattern is applied.

In the present, the UE may communicate with at least one of a mobile terminal, a network and an autonomous vehicle.

In a further aspect of the present disclosure, provided is a base station for receiving a Physical Uplink Control Channel (PUCCH) from a user equipment (UE) in a wireless communication system. The base station may include: a receiver; a transmitter; and a processor connected to the receiver and the transmitter. The processor may be configured to receive, from the UE, a first PUCCH including a Demodulation Reference Signal (DM-RS) to which a specific sequence hopping pattern is applied or a second PUCCH to which the specific sequence hopping pattern is applied. In this case, the specific sequence hopping pattern may be determined based on frequency hop index determined depending on whether frequency hopping is configured in a slot.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present disclosure, a sequence applied to a DM-RS transmitted together with a PUCCH or a PUCCH, may have various hopping patterns based on the presence of frequency hopping and/or slot indices.

Therefore, according to the present disclosure, interference between neighboring cells can be mitigated by inter-ference randomization between the neighboring cells.

The effects that can be achieved through the embodiments of the present disclosure are not limited to what has been particularly described hereinabove and other effects which are not described herein can be derived by those skilled in the art from the following detailed description. That is, it should be noted that the effects which are not intended by the present disclosure can be derived by those skilled in the art from the embodiments of the present disclosure.

DESCRIPTION OF DRAWINGS

The accompanying drawings, which are included to provide a further understanding of the invention, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE

Figure 1:
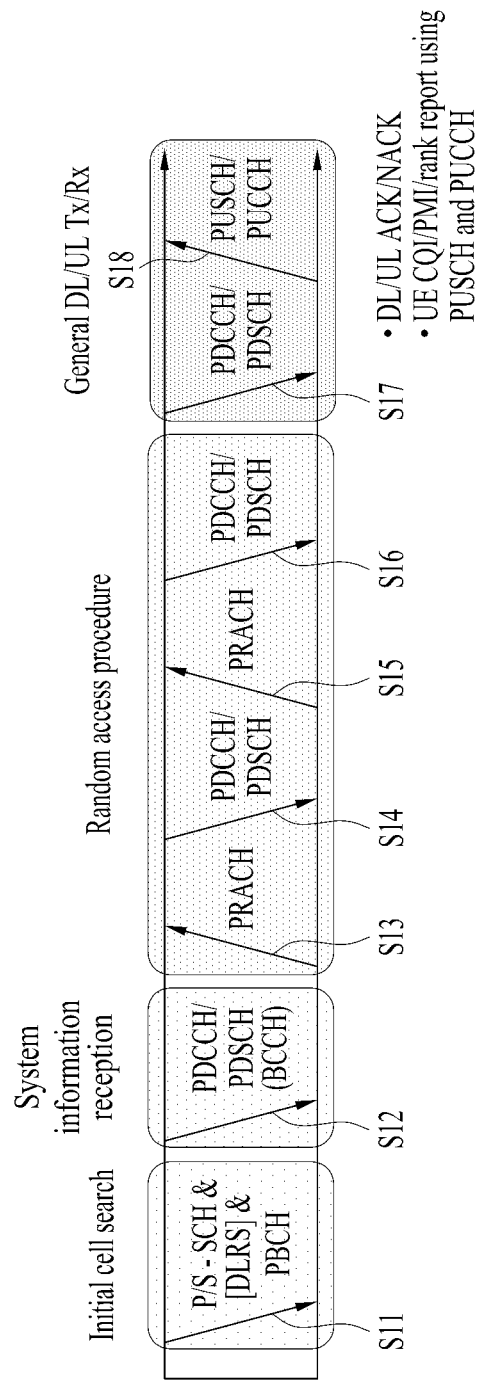
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While the embodiments of the present disclosure are described based on the 3GPP NR system as well as the 3GPP/LTE-A system to clarify the technical features of the present disclosure, the present disclosure is also applicable to the IEEE 802.16e/m system, etc.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
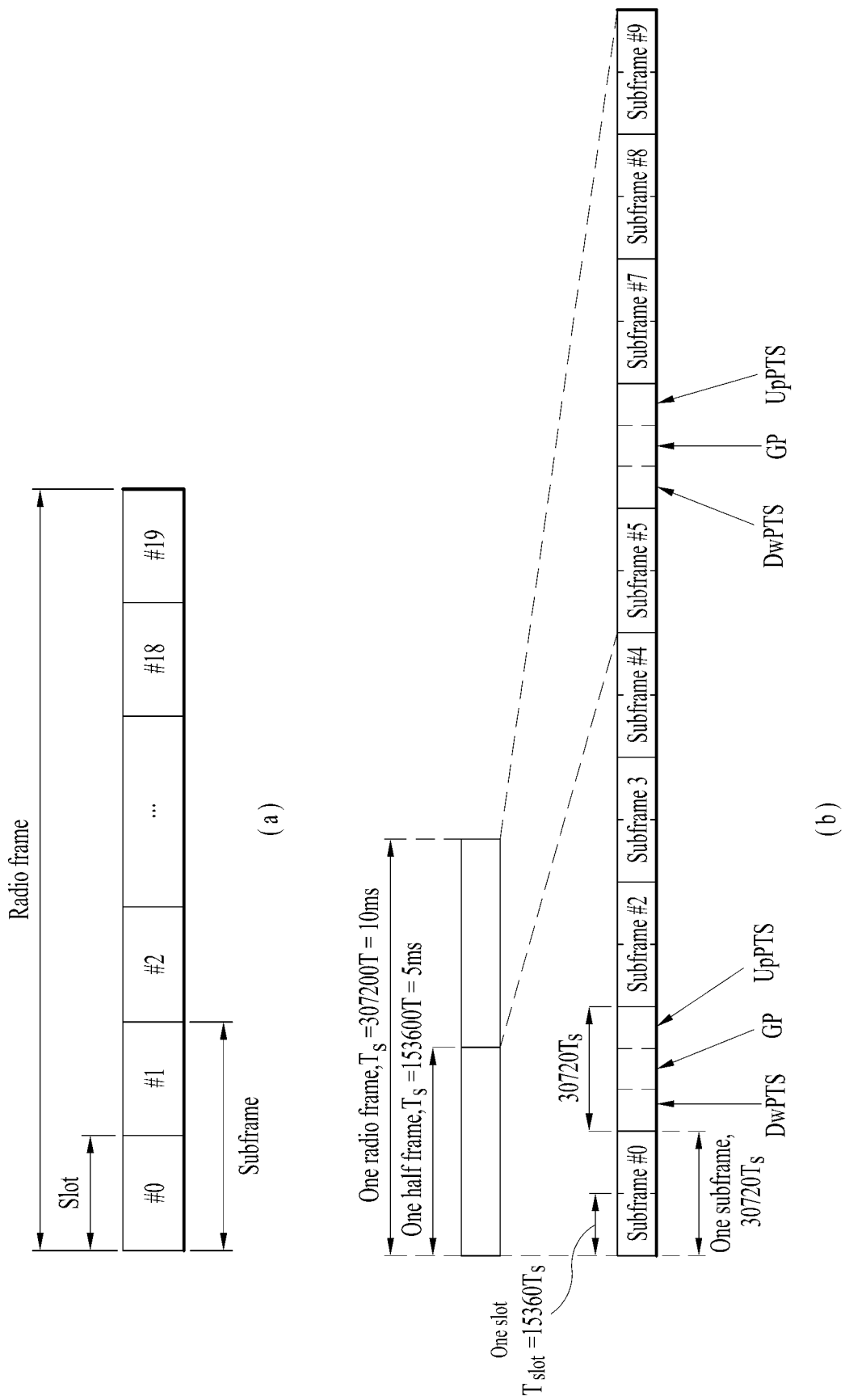
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·$T_s$ | 4384·$T_s$ | 5120·$T_s$ | 20480·$T_s$ | | |
| 6 | 19760·$T_s$ | | | 23040·$T_s$ | | |
| 7 | 21952·$T_s$ | | | 12800·$T_s$ | | |
| 8 | 24144·$T_s$ | | | — | — | — |
| 9 | 13168·$T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink)

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
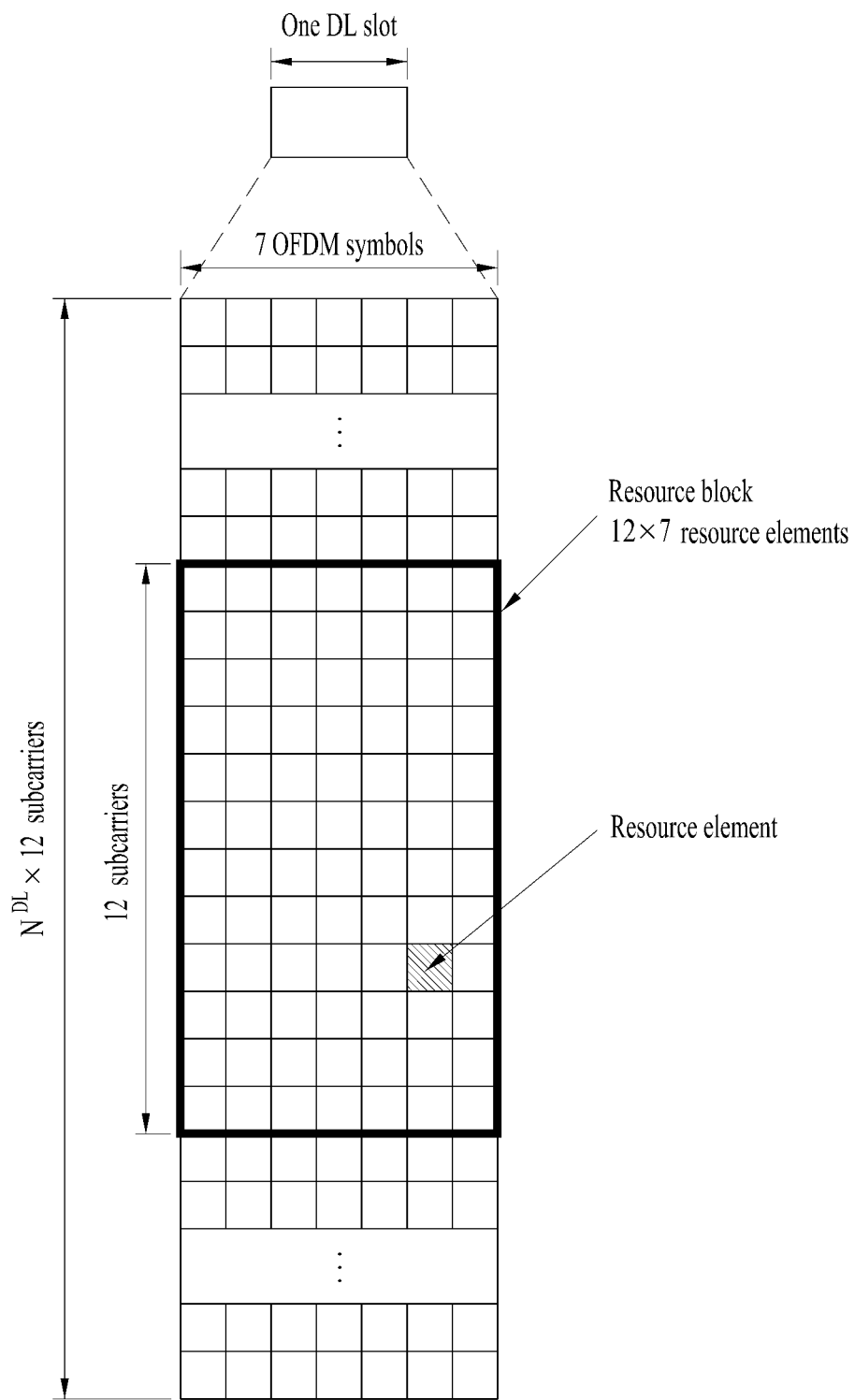
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
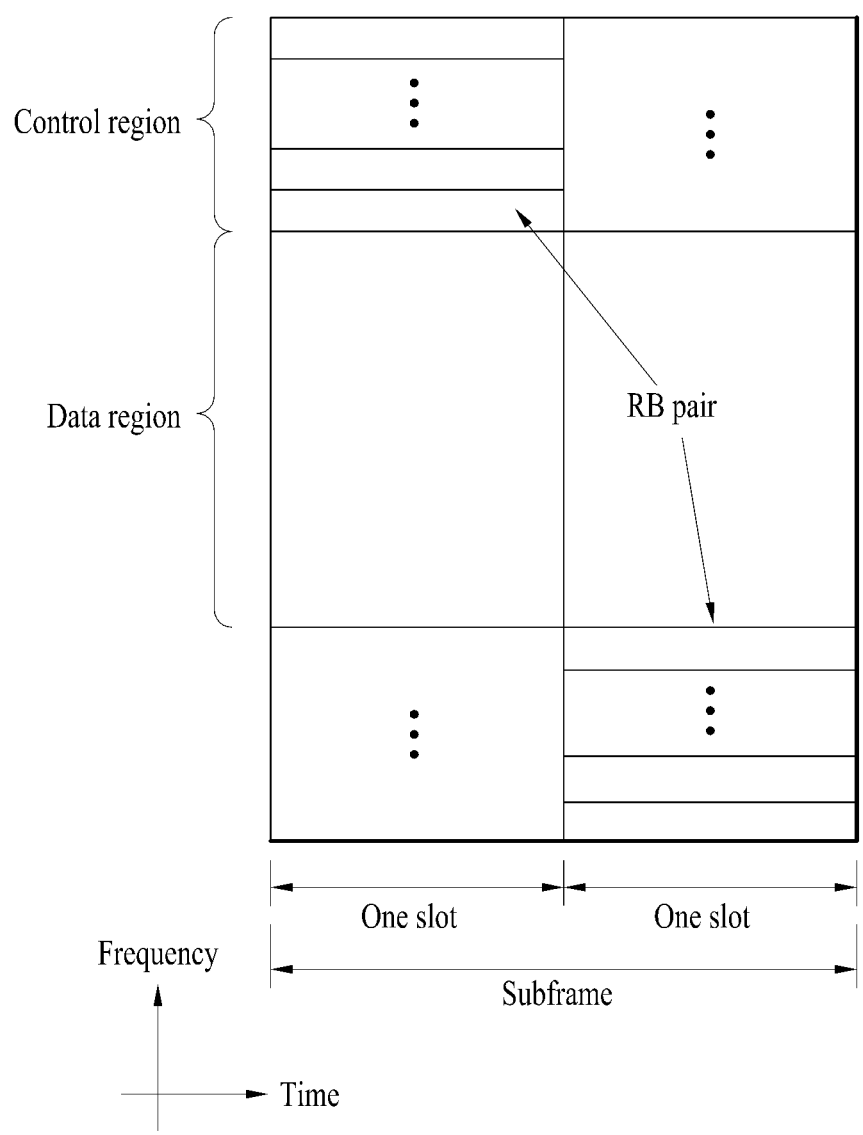
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus, it is said that the RB pair frequency-hops over a slot boundary.

Figure 5:
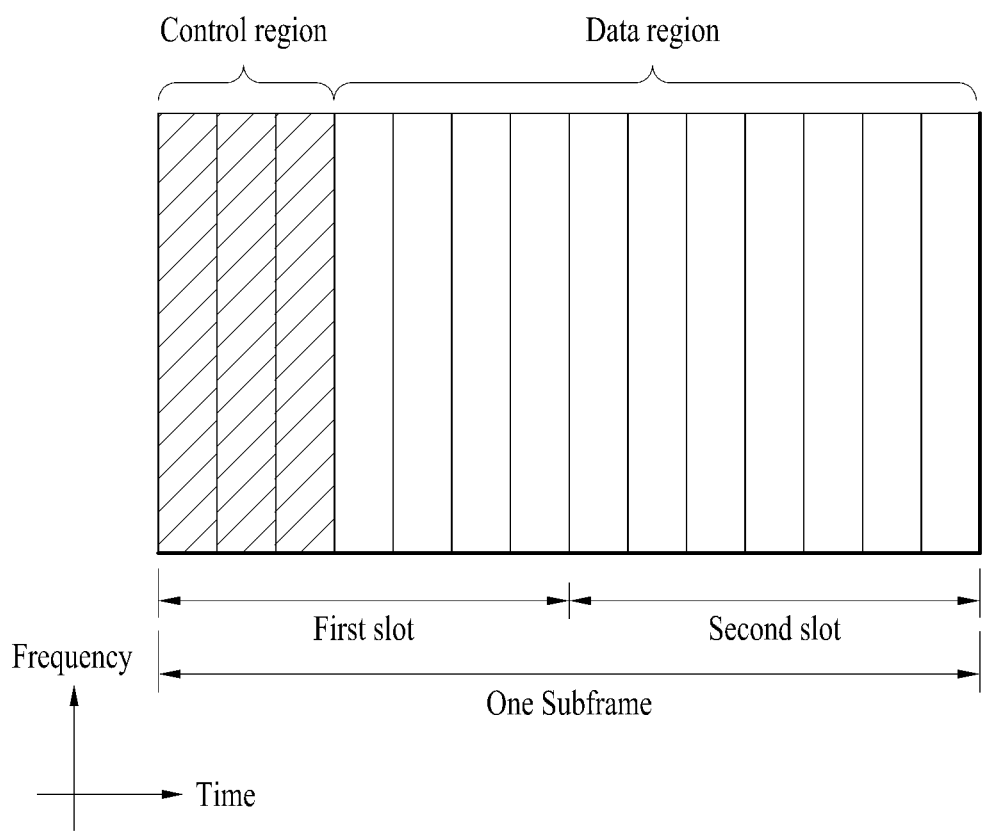
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, it has been defined that a User Equipment (UE) reports Channel State Information (CSI) to a Base Station (BS) (or an eNB). Here, the CSI means information indicating the quality of a radio channel (or link) formed between the UE and an antenna port.

For example, the CSI may include a Rank Indicator (RI), a Precoding Matrix Indicator (PMI), and a Channel Quality Indicator (CQI).

The RI indicates rank information about the corresponding channel, which means the number of streams that the UE receives through the same time-frequency resource. This value depends on Long Term Fading of the channel. In addition, the RI may be fed back by the UE to the BS with a longer period than the PMI or CQI.

The PMI is a value reflecting the characteristics of a channel space and indicates a precoding index preferred by the UE based on a metric such as SINR.

The CQI is a value indicating the strength of the channel and indicates a reception SINR that can be obtained when the BS uses the PMI.

In the 3GPP LTE or LTE-A system, the BS may set a plurality of CSI processes for the UE and receive a report on CSI for each process from the UE. Here, the CSI process is configured with a CSI-RS for specifying the quality of a signal from the BS and a CSI-Interference Measurement (CSI-IM) resource for interference measurement.

1.4. RRM Measurement

LTE systems support radio resource management (RRM) operations including power control, scheduling, cell search, cell reselection, handover, radio link or connection monitoring, and connection establishment/re-establishment. In this operation, a serving cell may make a request to a UE for RRM measurement information, which is a measurement value for performing the RRM operation. As typical information, in an LTE system, a UE may measure information such as cell search information on each cell, reference signal received power (RSRP), and reference signal received quality (RSRQ) and report the same as typical information. Specifically, in the LTE system, the UE may receive 'measConfig' from the serving cell over a higher-layer signal for RRM measurement and measure the RSRP or RSRQ according to the information of 'measConfig'.

Here, RSRP, RSRQ, and RSSI disclosed in the LTE system may be defined as follows.

First, reference signal received power (RSRP) is defined as the linear average over the power contributions (in [W])

of the resource elements that carry cell-specific reference signals within the considered measurement frequency bandwidth. For example, for RSRP determination the cell-specific reference signals $R_0$ shall be used. If the UE can reliably detect that $R_1$ is available it may use $R_1$ in addition to $R_0$ to determine RSRP. The reference point for the RSRP shall be the antenna connector of the UE.

The reference point for the RSRP shall be the antenna connector of the UE.

If receiver diversity is in use by the UE, the reported value shall not be lower than the corresponding RSRP of any of the individual diversity branches.

Reference Signal Received Quality (RSRQ) is defined as the ratio N×RSRP/(E-UTRA carrier RSSI), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signalling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

Next, Received Signal Strength Indicator (RSSI) is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

In accordance with the definitions above, in the case of intra-frequency measurement, a UE operating in the LTE system may measure RSRP in the bandwidth indicated through the allowed measurement bandwidth-related information element (IE) transmitted on system information block type 3 (SIB3). Alternatively, in the case of inter-frequency measurement, the UE may measure RSRP in a bandwidth corresponding to one of 6, 15, 25, 50, 75, and 100 resource blocks (RBs) indicated through the allowed measurement bandwidth transmitted in SIB5. Alternatively, in the case where the IE is absent, the UE may measure RSRP in the frequency band of the entire downlink (DL) system as a default operation.

In this case, if the UE receives the information on the allowed measurement bandwidth, the UE may consider the corresponding value as the maximum measurement bandwidth and freely measure the RSRP value within the range of the corresponding value. However, if the serving cell transmits an IE defined as WB-RSRQ to the UE and the allowed measurement bandwidth is set to 50 RBs or more, the UE shall calculate the RSRP value for the entire allowed measurement bandwidth. In the RSSI measurement, the UE measures RSSI using the frequency band of the receiver of the UE according to the definition of the RSSI bandwidth.

2. New Radio Access Technology System

As a number of communication devices have required higher communication capacity, the necessity for the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present disclosure, the corresponding technology is referred to as the new RAT or new radio (NR) for convenience of description.

2.1. Numerologies

The NR system to which the present disclosure is applicable supports various OFDM numerologies shown in the following table. In this case, the value of μ and cyclic prefix information per carrier bandwidth part may be signaled in DL and UL, respectively. For example, the value of pt and cyclic prefix information per downlink carrier bandwidth part may be signaled though DL-BWP-mu and DL-MWP-cp corresponding to higher layer signaling. As another example, the value of p and cyclic prefix information per uplink carrier bandwidth part may be signaled though UL-BWP-mu and UL-MWP-cp corresponding to higher layer signaling.

TABLE 3

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe,\mu} - 1\}$ and may also be numbered within a frame in ascending order like $n_{s,f}^\mu \in \{0, \ldots, N_{slot}^{frame,\mu} - 1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present disclosure is applicable, a self-contained slot structure may be applied based on the above-described slot structure.

Figure 6:
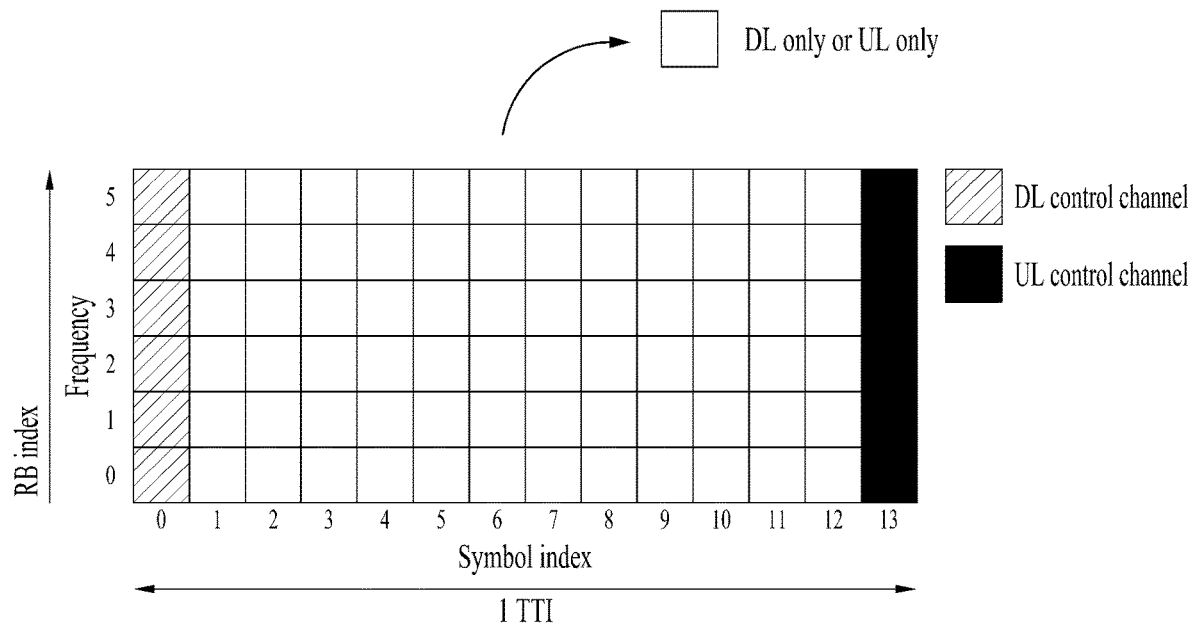
FIG. 6 is a diagram illustrating a self-contained subframe structure applicable to the present disclosure.

FIG. 6 is a diagram illustrating a self-contained slot structure applicable to the present disclosure.

In FIG. 6, the hatched area (e.g., symbol index=0) indicates a downlink control region, and the black area (e.g., symbol index=13) indicates an uplink control region. The remaining area (e.g., symbol index=1 to 13) may be used for DL or UL data transmission.

Based on this structure, the eNB and UE may sequentially perform DL transmission and UL transmission in one slot. That is, the eNB and UE may transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions may be selectively included in the self-contained slot structure. In other words, the self-contained slot structure according to the present disclosure may include either the DL control region or the UL control region as well as both the DL and UL control regions as shown in FIG. 6.

In addition, for example, the slot may have various slot formats. In this case, OFDM symbols in each slot may be divided into downlink symbols (denoted by 'D'), flexible symbols (denoted by 'X'), and uplink symbols (denoted by 'U').

Thus, the UE may assume that DL transmission occurs only in symbols denoted by 'D' and 'X' in the DL slot. Similarly, the UE may assume that UL transmission occurs only in symbols denoted by 'U' and 'X' in the UL slot.

2.3. Analog Beamforming

In a millimeter wave (mmW) system, since a wavelength is short, a plurality of antenna elements may be installed in the same area. That is, considering that the wavelength at 30 GHz band is 1 cm, a total of 100 antenna elements may be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

Figure 7:
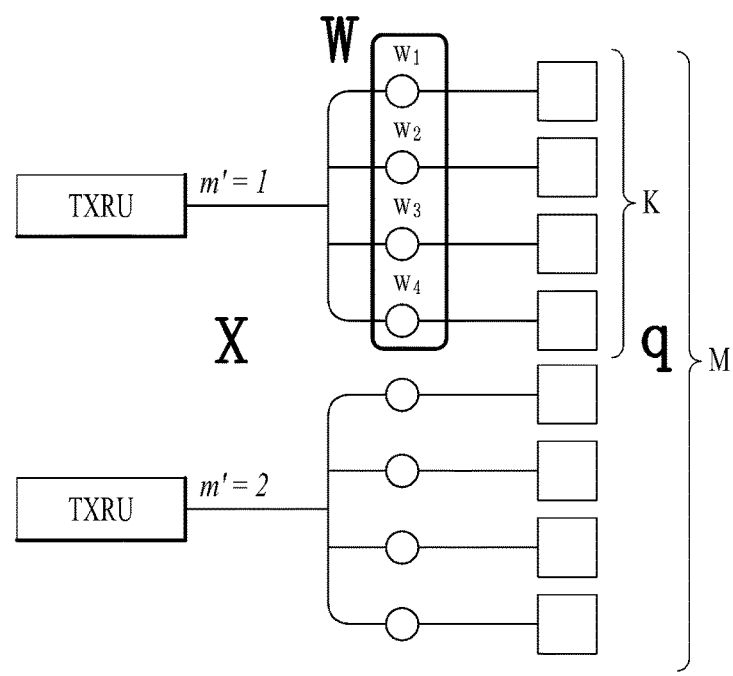
FIGS. 7 and 8 are diagrams illustrating representative connection methods for connecting TXRUs to antenna elements.
Figure 8:
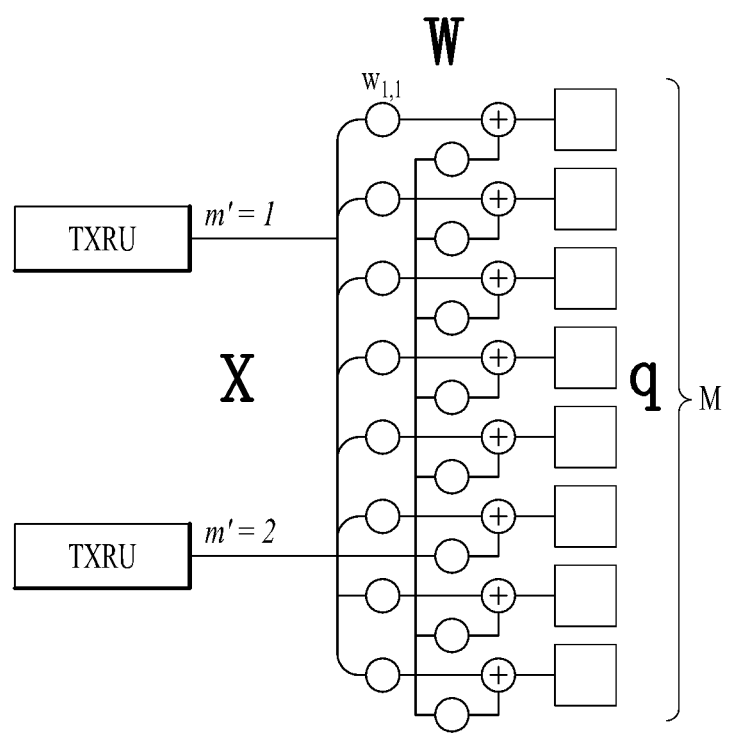

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas may be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present disclosure is applicable, the hybrid beamforming method obtained by combining the digital beamforming and analog beamforming may be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
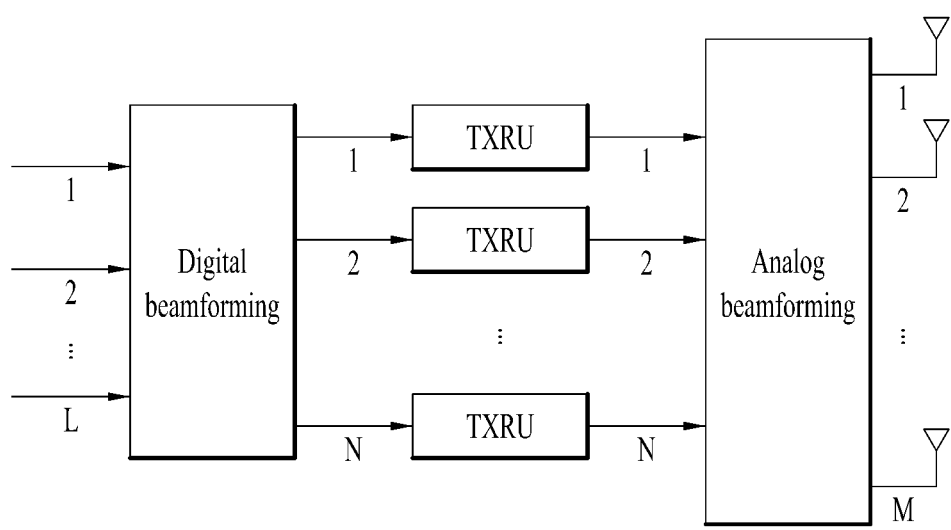
FIG. 9 is a schematic diagram illustrating a hybrid beamforming structure according to an embodiment of the present disclosure in terms of TXRUs and physical antennas.

FIG. 9 is a schematic diagram illustrating a hybrid beamforming structure according to an embodiment of the present disclosure in terms of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present disclosure is applicable. Further, a method of introducing a plurality of antenna panels where independent hybrid beamforming may be applied by defining N TXRUs and M RF antennas as one antenna panel has also been considered in the NR system to which the present disclosure is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present disclosure is applicable.

Figure 10:
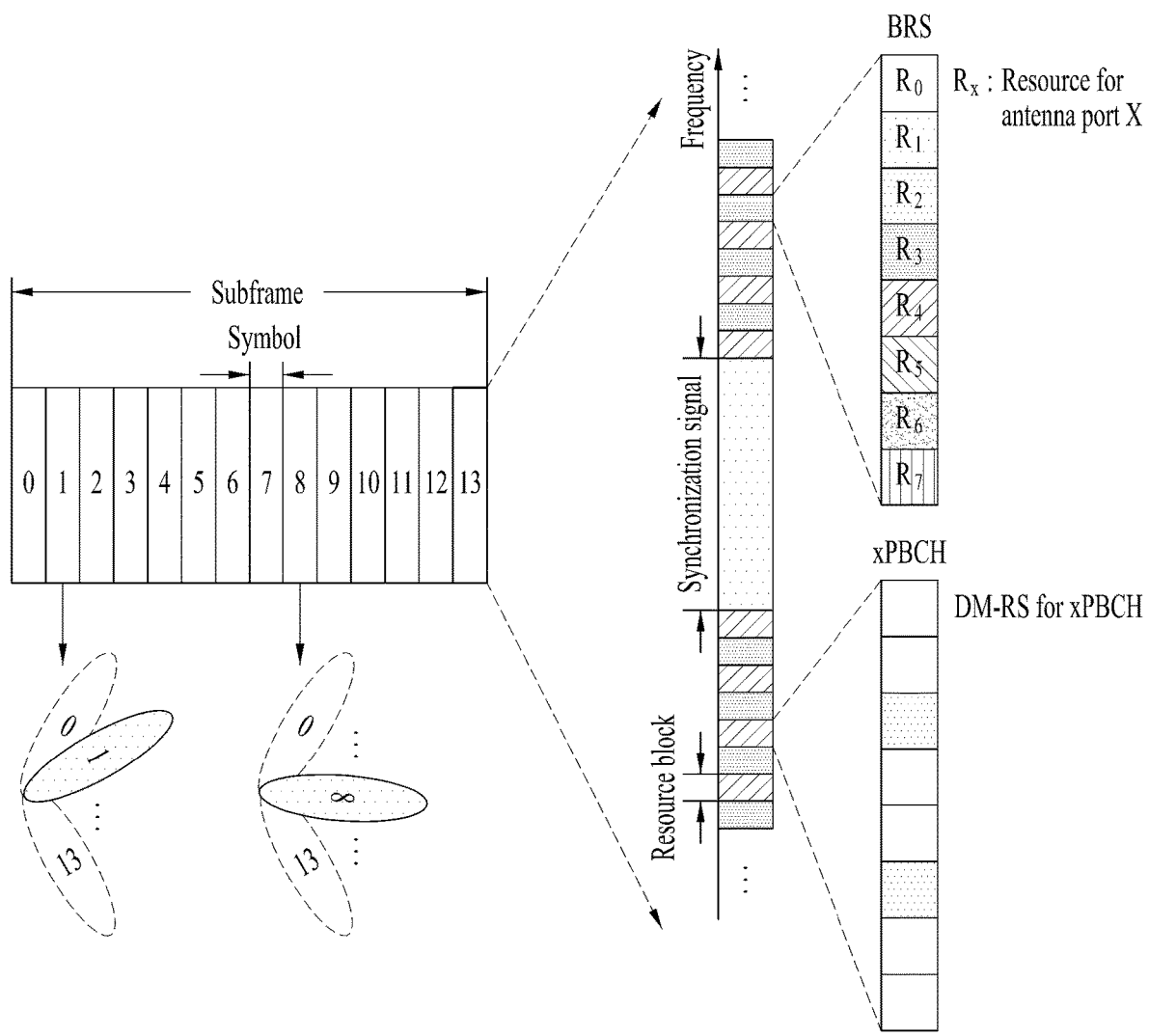
FIG. 10 is a diagram schematically illustrating the beam sweeping operation for synchronization signals and system information during a downlink (DL) transmission process according to an embodiment of the present disclosure.

FIG. 10 is a diagram schematically illustrating the beam sweeping operation for synchronization signals and system information during a downlink (DL) transmission process according to an embodiment of the present disclosure In FIG. 10, a physical resource (or channel) for transmitting system information of the NR system to which the present disclosure is applicable in a broadcasting manner is referred to as a physical broadcast channel (xPBCH). In this case, analog beams belonging to different antenna panels may be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present disclosure is applicable. The BRS may be defined for a plurality of antenna ports, and each BRS antenna port may correspond to a single analog beam. In this case, in contrast to the BRS, all analog beams in the analog beam group may be applied to the synchronization signal or xPBCH to assist a random UE to correctly receive the synchronization signal or xPBCH.

3. Proposed Embodiments

Hereinafter, the embodiments of the present disclosure will be described in detail based on the above-described technical features.

Specifically, a wireless communication system including a BS and a UE may support multiple sequence groups, each of which is composed of one or more base sequences. In this case, after selecting a specific base sequence from a plurality of sequence groups, the UE may generate a sequence by applying a (time or frequency domain) Cyclic Shift (CS) and use the generated sequence for (sequence-selection-based) UL control and/or a UL Reference Signal (RS). Regarding the above-described UE operation, the present disclosure proposes a method of changing a sequence group index and/or a CS index offset value for each time and/or frequency resource unit based on a specific hopping pattern.

For convenience of description, an operation of changing a sequence group per specific resource unit is named 'sequence group hopping'.

In addition, an operation of changing a base sequence (in the same sequence group) per specific resource unit is named 'sequence hopping'.

Moreover, an operation of changing a CS value (applied to the same base sequence) per specific resource unit is named 'CS hopping'.

The NR system to which the present disclosure is applicable is intended to support a plurality of logical networks in a single physical system. Accordingly, it is designed to support services with various requirements (e.g., enhanced Mobile Broadband (eMBB), massive Machine Type Communication (mMTC), Ultra Reliability Low Latency Communication (URLLC), etc.). In addition, the NR system is designed to support, as a PUCCH, which is a physical channel for UCI transmission, a PUCCH composed of a relatively large number of OFDM symbols (e.g., 4 or more symbols) to support large UL coverage (hereinafter, a long PUCCH) and a PUCCH composed of a relatively small number of OFDM symbols (e.g., 1 or 2 symbols) to support low latency transmission (hereinafter, a short PUCCH).

The short PUCCH may have at least one transmission structure. For example, if UCI to be transmitted on a short PUCCH has a small amount of information (e.g., 1 or 2 bits), a BS may allocate a UE a sequence set composed of multiple sequences as short PUCCH resources, and the UE may perform transmission by selecting a specific sequence corresponding to UCI to transmit from the sequences allocated as the short PUCCH resources. In this case, the sequence may be designed to satisfy low peak power to average power ratio (PAPR) characteristics.

For convenience of description, the above-described sequence-based short-PUCCH is named 'SEQ-PUCCH'.

The above-described sequence group hopping, sequence hopping, and/or CS hopping may be applied to sequences used for the SEQ-PUCCH of the NR system to which the present disclosure is applicable.

Accordingly, the present disclosure proposes a method of changing a sequence group index and/or a CS index offset value for such an SEQ-PUCCH per time and/or frequency resource unit based on a specific hopping pattern when a plurality of sequence groups, each of which is composed of one or multiple base sequences, are defined in the NR system.

Although the operations of the present disclosure are described in terms of sequence hopping, the operations may be applied to resource hopping. In other words, 'sequence' mentioned in the present disclosure may also be interpreted as 'resource'.

Herein, a sequence-modulation-based PUCCH may mean a PUCCH carrying UCI by multiplying a sequence and a modulated symbol (e.g., Binary Phase Shift Keying (BPSK), Quadrature Phase Shift Keying (QPSK), etc.).

In the present disclosure, multiple sequence groups, each of which is composed of one or more base sequences applicable to SEQ-PUCCHs (or UL DM-RSs or sequence-modulation-based PUCCHs), may be defined, and a sequence group to which a base sequence(s) available for an SEQ-PUCCH (or a UL DM-RS or a sequence-modulation-based PUCCH) to be transmitted in a specific resource unit belong (or a sequence group index) may be determined according to the output value of a first specific function with input of an initial value and information on the corresponding resource unit. For convenience of description, the first function is named 'sequence group hopping pattern'.

In addition, a base sequence(s) applicable to an SEQ-PUCCH (or a UL DM-RS or a sequence-modulation-based PUCCH) to be transmitted in a specific resource unit may be restricted to belong to the same sequence group, and a base sequence selected from a sequence group may be determined according to the output value of a second specific function with input of an initial value and information on the corresponding resource unit. For convenience of description, the second function is named 'sequence hopping pattern'.

Moreover, a CS value (or a CS offset value) for a base sequence(s) applicable to an SEQ-PUCCH (or a UL DM-RS or a sequence-modulation-based PUCCH) to be transmitted in a specific resource unit may be determined according to the output value of a third function with input of an initial value and information on the index of the corresponding resource unit. For convenience of description, the third function is named 'CS hopping pattern'.

In the present disclosure, a slot may mean a basic time unit for scheduling, and one slot may be composed of multiple mini-slots.

In addition, a UL control resource set may mean a time-frequency resource region for transmitting UL control information such as a PUCCH, etc. A BS may configure, for a specific UE, one or more distinguished UL control resource sets within the system bandwidth.

3.1. First Sequence/Sequence Group/CS Hopping Supporting Method

A BS may configure for a UE whether the sequence group hopping pattern (or the sequence hopping pattern or the CS hopping pattern) for an SEQ-PUCCH (or a UL DM-RS or a sequence-modulation-based pattern) is applied (i.e., enabled or disabled) using one of the following methods.

(1) Whether the pattern is applied is configured by a Physical Broadcast Channel (PBCH) and/or a System Information Block (SIB) (or system information).

Whether the pattern is applied (for each UL control resource set) is configured by (UE-specific) Radio Resource Control (RRC) signaling.

In the NR system to which the present disclosure is applicable, a UE may not always support signal transmission and reception in the whole system bandwidth. In other words, the UE may have a Radio Frequency (RF) circuit with a bandwidth smaller than the whole system bandwidth. Accordingly, when the UE transmits UL control information such as a PUCCH, etc., it may be difficult to define a cell-common UL control transmission region, which has been used in the LTE system, in the NR system to which the present disclosure is applicable.

At least one UL control resource set may be flexibly configured in the NR system to which the present disclosure is applicable. In this case, whether the sequence group hopping pattern (or the sequence hopping pattern or the CS hopping pattern) is applied may be configured independently for each UL control resource set. The configuration information may be UE-commonly transmitted through system information such as an SIB, or it may be transmitted via (UE-specific) RRC signaling.

The above-described first sequence/sequence group/CS hopping supporting method may be applied together with other proposed methods of the present disclosure unless they collide with each other.

3.2. Second Sequence/Sequence Group/CS Hopping Supporting Method

When the sequence group hopping pattern (or the sequence hopping pattern or the CS hopping pattern) is determined based on an initial value and index information on a resource unit (where a sequence is transmitted) (or when the sequence group hopping pattern (or the sequence hopping pattern or the CS hopping pattern) is determined based on a function with input of the initial value and the index information on the resource unit (where the sequence is transmitted)), one of the following items or any combination thereof may be used as the index information on the resource unit (where the sequence is transmitted).

(1) Slot index (or mini-slot index)
(2) Symbol index
(3) Physical Resource Block (PRB) index
(4) Local symbol index (in UL control region or PUCCH)
(5) Local PRB index (in UL control region or PUCCH)
(6) UL control resource set index Here, a PRB may mean the index of a frequency domain resource unit, and a UL control resource set may mean a time-frequency domain resource region for transmitting UL control such as a PUCCH, etc.

Figure 11:
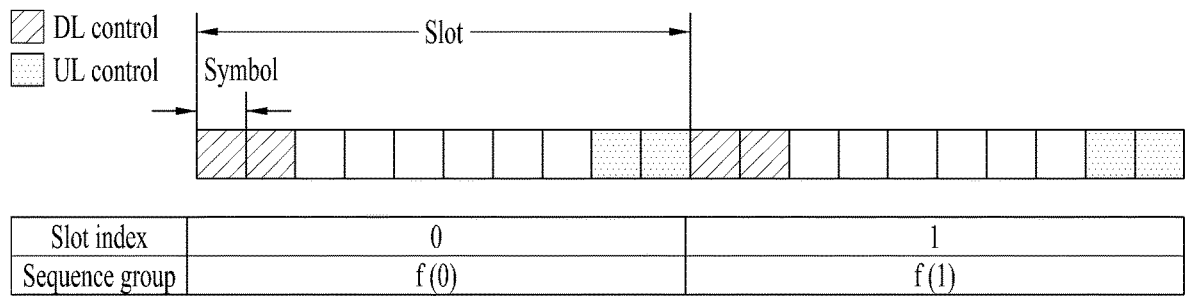
FIGS. 11 to 15 are diagrams illustrating various sequence/sequence group/CS hopping supporting methods according to the present disclosure.

FIG. 11 schematically illustrates a sequence/sequence group/CS hopping supporting method according to an embodiment of the present disclosure.

For example, the sequence group hopping pattern (or the sequence hopping pattern or the CS hopping pattern) may be given as a function of f(x) (where x may be a vector), and the function may use a slot index as input. In this case, a sequence group (or a base sequence or a CS value) used for an SEQ-PUCCH (or a UL DM-RS) may be the same within one slot but vary for each slot as shown in FIG. 11.

Figure 12:
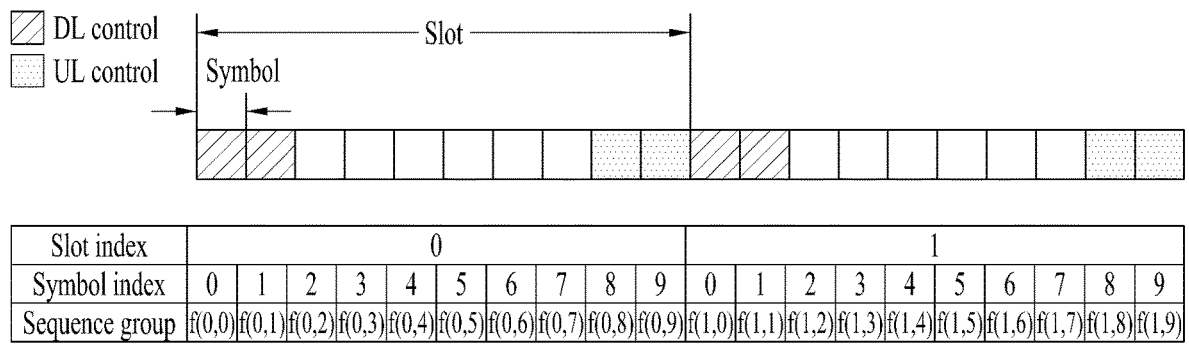

FIG. 12 schematically illustrates a sequence/sequence group/CS hopping supporting method according to another embodiment of the present disclosure.

As another example, the sequence group hopping pattern (or the sequence hopping pattern or the CS hopping pattern) may be given as a function of f(x) (where x may be a vector), and the function may use a symbol index as input. In this case, a sequence group (or a base sequence or a CS value) used for an SEQ-PUCCH (or a UL DM-RS) may vary on a symbol basis within a slot as shown in FIG. 12.

As still another example, the sequence group hopping pattern (or the sequence hopping pattern or the CS hopping pattern) may be given as a function of f(x) (where x may be a vector), and the function may use a slot index and a local symbol index (in a UL control region) as input. In this case, the local symbol index may be an index defined for the UL control region configured within the current slot or an index defined for the maximum symbol period, which can be configured as the UL control region.

As a further example, the sequence group hopping pattern (or the sequence hopping pattern or the CS hopping pattern) may be given as a function of f(x) (where x may be a vector), and the function may use a slot index as input. Additionally, the sequence group hopping pattern (or the sequence hopping pattern or the CS hopping pattern) may have a different initial value for each symbol.

For instance, in the case of the last symbol within a slot, the slot index may be inputted to the sequence group hopping pattern (or the sequence hopping pattern or the CS hopping pattern) after an initial value of $X_0$ is applied. On the other hand, in the case of the second last symbol within the slot, the slot index may be inputted to the sequence group hopping pattern (or the sequence hopping pattern or the CS hopping pattern) after an initial value of $X_1$ is applied.

In this case, a BS may configure $X_0$ and $X_1$ UE-commonly through system information such as an SIB, etc., or UE-specifically through a (UE-specific) higher layer signal such as RRC signaling, etc. In other words, the BS may configure the initial value of the sequence group hopping pattern (or the sequence hopping pattern or the CS hopping pattern) per symbol using a higher layer signal.

In addition, when the CS offset value for a specific resource unit is determined depending on the CS hopping pattern, an SEQ-PUCCH transmitted in the corresponding resource unit may represent UCI by selecting one of a plurality of CS resources. In this case, a value obtained by adding the CS offset value depending on the CS hopping pattern to a CS value selected based on a specific UCI state may be used as the final CS resource.

The above-described second sequence/sequence group/CS hopping supporting method may be applied together with other proposed methods of the present disclosure unless they collide with each other.

3.3. Third Sequence/Sequence Group/CS Hopping Supporting Method

When the sequence group hopping pattern (or the sequence hopping pattern or the CS hopping pattern) is determined using as input an initial value and index information on a resource unit (where a sequence is transmitted), the initial value may be configured as follows.

(1) Before receipt of (UE-specific) RRC signaling (i.e., initial access procedure)

(1-1) The initial value is configured based on a Physical Cell ID (PCID), which is detected from a synchronization signal, or a beam ID. In this case, the beam ID may be deduced from the index of a resource region (dedicated to the synchronization signal).

(1-2) The initial value is configured based on a Virtual Cell ID (VCID), which is indicated by a PBCH/SIB/Random Access Response (RAR), or a beam ID. In this case, the VCID or beam ID may be configured independently from a PCID.

(2) After receipt of (UE-specific) RRC signaling

The initial value is configured based on a specific seed value configured by a BS. In this case, the BS may configure an independent seed value for each symbol and/or UL control resource set.

For example, if a UE is going to receive (UE-specific) RRC signaling after performing a random access procedure, the UE may obtain the initial value of the sequence group hopping pattern (or the sequence hopping pattern or the CS hopping pattern) from detected information (from a synchronization signal) or system information such as a PBCH/SIB (configured by the BS).

Alternatively, if a UE is able to receive (UE-specific) RRC signaling, the BS may UE-specifically configure the initial value of the sequence group hopping pattern (or the sequence hopping pattern or the CS hopping pattern). In this case, the initial value may be configured independently for each symbol and/or UL control resource set.

The above-described third sequence/sequence group/CS hopping supporting method may be applied together with other proposed methods of the present disclosure unless they collide with each other.

3.4. Fourth Sequence/Sequence Group/CS Hopping Supporting Method

When the sequence group hopping pattern (or the sequence hopping pattern) is applied to a PUCCH, a time unit to which the sequence group hopping pattern (or the sequence hopping pattern) is applied may vary depending on the number of symbols included in the PUCCH.

Specifically, the basic transmission unit for a long PUCCH may be a slot (or mini-slot), whereas the basic transmission unit for a short PUCCH may be a symbol. Thus, in the case of the long PUCCH, the sequence group hopping pattern (or the sequence hopping pattern) may be applied on a slot basis using a slot index as input. On the other hand, in the case of the short PUCCH, the sequence group hopping pattern (or the sequence hopping pattern) may be applied on a symbol basis using a symbol index as input. In addition, when the long PUCCH is transmitted in multiple slots, the sequence group hopping pattern (or the sequence hopping pattern or the CS hopping pattern) may be applied on a multi-slot basis using the indices of the multiple slots as input.

The above-described fourth sequence/sequence group/CS hopping supporting method may be applied together with other proposed methods of the present disclosure unless they collide with each other.

3.5. Fifth Sequence/Sequence Group/CS Hopping Supporting Method

When the sequence group hopping pattern (or the sequence hopping pattern or the CS hopping pattern) is repeated with a predetermined period, the period may be configured as one of the following.

(1) Fixed time duration (corresponding to a radio frame) (e.g., 10 ms)

(2) Time duration corresponding to a fixed number of slots (regardless of numerology)

(3) Time duration corresponding to a specific number of slots (configured by a BS)

For example, the sequence group hopping pattern (or the sequence hopping pattern or the CS hopping pattern may be configured to have a period of a specific number of slots. In this case, regardless of the numerology, the sequence group hopping pattern (or the sequence hopping pattern or the CS hopping pattern) may be configured to always have the same number of slots as its period.

Alternatively, as Subcarrier Spacing (SCS) increases, a time unit may decrease, and more sequence group hopping patterns (or sequence hopping patterns or CS hopping patterns) may be required. In this case, the sequence group hopping pattern (or the sequence hopping pattern or the CS hopping pattern) may be configured to have a fixed time period (e.g., 10 ms). That is, as the SCS increases, the number of slots within the time period increases, and thus the number of sequence hopping patterns may significantly increase.

In the present disclosure, numerology may mean the length of a symbol and SCS in an OFDM structure.

Additionally, for specific numerology (or SCS), a period and unit to which the sequence group hopping pattern (or the sequence hopping pattern or the CS hopping pattern) is applied may be determined according to one of the following options.

Figure 13:
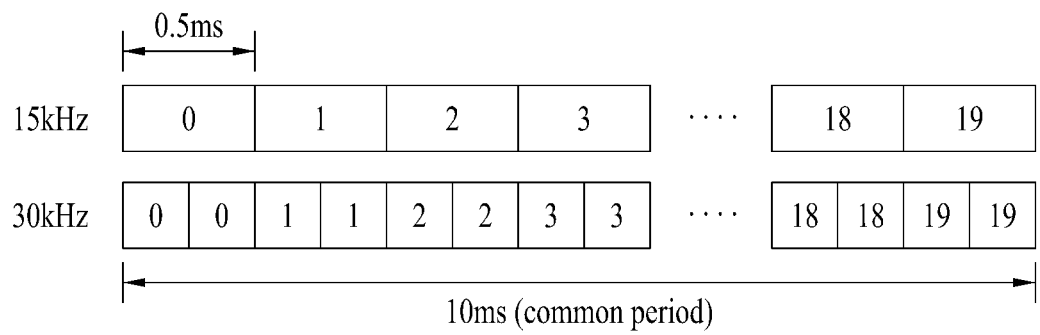

FIG. 13 schematically illustrates a configuration in which the sequence group hopping pattern (or the sequence hopping pattern or the CS hopping pattern) is applied with a specific period and on a specific basis for specific numerology (or SCS) according to an embodiment of the present disclosure. Hereinafter, Option 1 applicable to the present disclosure will be described in detail with reference to FIG. 13.

(1) Option 1: A fixed time period and the sequence group hopping pattern (or the sequence hopping pattern or the CS hopping pattern) in a unit of a fixed time unit are applied.

For example, the sequence group hopping pattern (or the sequence hopping pattern or the CS hopping pattern) may be applied with a period of 10 ms and on a 0.5 ms basis.

In the case of SCS=15 kHz, a length-20 hopping pattern is applied, and sequence group (or sequence or CS) hopping is performed on a slot basis.

In the case of SCS=15 kHz*N, a length–20 hopping pattern is applied, and sequence group (or sequence or CS) hopping is performed on an N-slot basis.

When there are a plurality of slots within the fixed time unit, the initial value of the sequence group hopping pattern (or the sequence hopping pattern or the CS hopping pattern) may vary depending on the relative locations of the slots in the fixed time unit.

When there are a plurality of slots within the fixed time unit, additional sequence hopping (e.g., base sequence hopping in the same sequence group) may be applied to the plurality of slots in the fixed time unit, or an offset value may be applied to the sequence group index depending on the (relative) locations of the slots in the fixed time unit.

Figure 14:
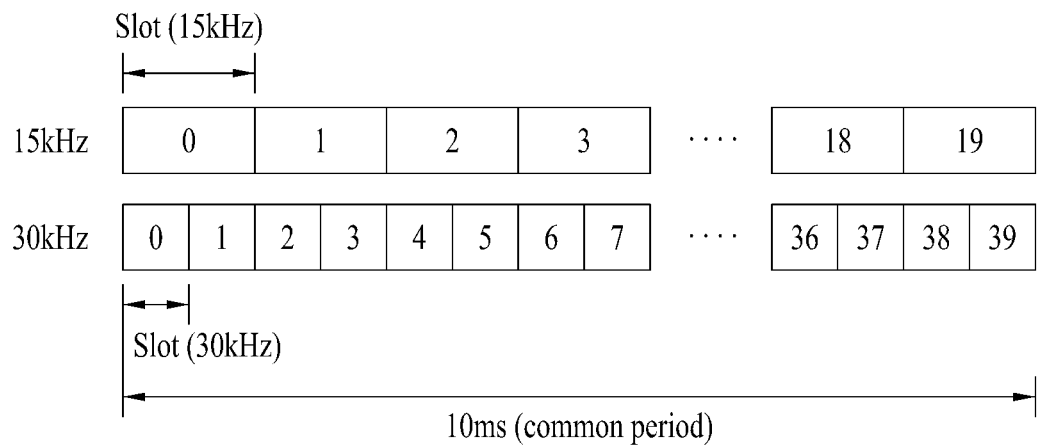

FIG. 14 schematically illustrates a configuration in which the sequence group hopping pattern (or the sequence hopping pattern or the CS hopping pattern) is applied with a specific period and on a specific basis for specific numerology (or SCS) according to another embodiment of the present disclosure. Hereinafter, Option 2 applicable to the present disclosure will be described in detail with reference to FIG. 14.

(2) Option 2: The sequence group hopping pattern (or the sequence hopping pattern or the CS hopping pattern) is applied with a fixed time period and on a scalable time unit basis (depending on numerology).

For example, the sequence group hopping pattern (or the sequence hopping pattern or the CS hopping pattern) may be applied with a period of 10 ms and on a (mini-) slot basis (depending on numerology).

In the case of SCS=15 kHz, a length–20 hopping pattern is applied, and sequence group (or sequence or CS) hopping is performed on a slot (0.5 ms) basis.

In the case of SCS=15 kHz*N, a length–(20*N) hopping pattern is applied, and sequence group (or sequence or CS) hopping is performed on a slot (0.5 ms/N) basis.

Figure 15:
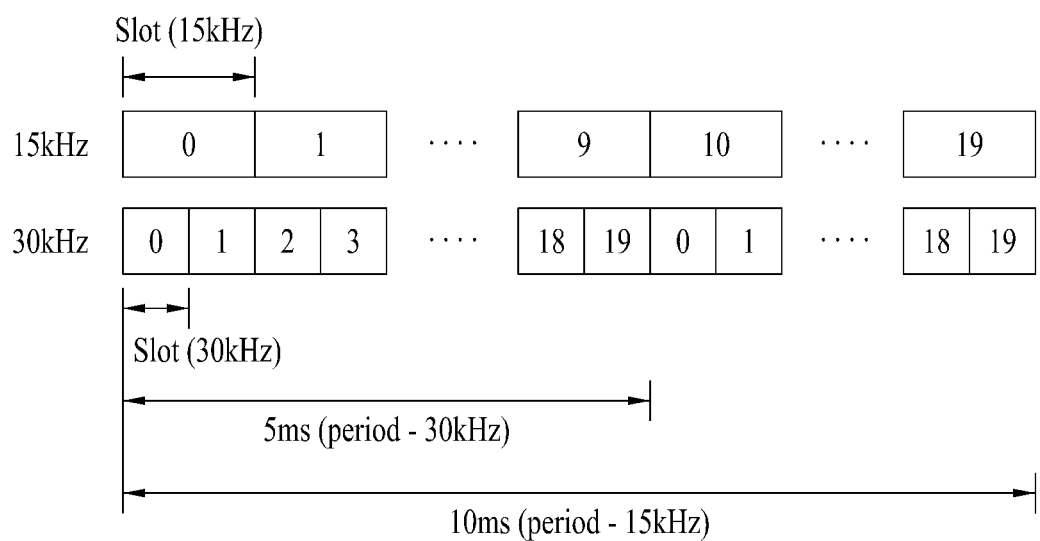

FIG. 15 schematically illustrates a configuration in which the sequence group hopping pattern (or the sequence hopping pattern or the CS hopping pattern) is applied with a specific period and on a specific basis for specific numerology (or SCS) according to another embodiment of the present disclosure. Hereinafter, Option 3 applicable to the present disclosure will be described in detail with reference to FIG. 15.

(3) Option 3: The sequence group hopping pattern (or the sequence hopping pattern or the CS hopping pattern) is applied with a period of X scalable time units (depending on numerology) (where X is a fixed value) and on a scalable time unit basis (depending on the numerology).

For example, the sequence group hopping pattern (or the sequence hopping pattern or the CS hopping pattern) may be applied with a period of 20 (mini-) slots (depending on numerology) and on a (mini-) slot basis (depending on the numerology).

In the case of SCS=15 kHz, a length–20 hopping pattern is applied, and sequence group (or sequence or CS) hopping is performed on a slot (0.5 ms) basis. In this case, the period may be set to 20 slots (i.e., 10 ms).

In the case of SCS=15 kHz*N, a length–20 hopping pattern is applied, and sequence group (or sequence or CS) hopping is performed on a slot (0.5 ms/N) basis. In this case, the period may be set to 20 slots (10 ms/N).

When there are a plurality of time periods in specific fixed time duration, additional sequence hopping (e.g., base sequence hopping in the same sequence group) may be applied to the plurality of time periods in the specific fixed time duration, or an offset value may be applied to the sequence group index depending on the (relative) locations of the time periods in the specific fixed time duration.

The above-described fifth sequence/sequence group/CS hopping supporting method may be applied together with other proposed methods of the present disclosure unless they collide with each other.

3.6. Sixth Sequence/Sequence Group/CS Hopping Supporting Method

When there are N PRBs and M CS values per PRB, L resources for a $\log_2(L)$-bit SEQ-PUCCH may be allocated as follows.

(1) A BS configures the values of $k_0$ (e.g., $k_0 \in \{0, 1, \ldots, M*N-1\}$) and $\Delta k$ (e.g., $\Delta k \in \{1, 2, 3\}$) for a UE.

This information may be configured through a higher layer signal such as RRC signaling.

(2) The UE may use L CS resources corresponding to $k(p)=k_0+\Delta k*p$ for $p=0, 1, \ldots, L-1$.

In this case, the PRBs and CS resources corresponding to k(p) may be configured as follows.

floor(k(p)/M) indicates the index of a specific PRB among the N PRBs.

k(p) mod M indicates the index of a specific CS in the specific PRB.

More specifically, considering the efficiency of resource allocation for the SEQ-PUCCH, if the SEQ-PUCCH is configured using only sequences corresponding to CS resources in one PRB, it may decrease the resource allocation efficiency because there are unused CS resources in the specific PRB. Therefore, it may be preferable that the UE configures the SEQ-PUCCH using CS resources in multiple PRBs.

However, to this end, the BS should separately provide information on a PRB resource (to which a corresponding CS belongs) for each CS to the UE when allocating resources for the SEQ-PUCCH. That is, this operation may not be desirable in terms of signaling overhead.

Therefore, the present disclosure proposes a method of using CS resources for multiple PRBs to configure an SEQ-PUCCH while reducing signaling overhead.

For example, when each of a plurality of PRBs has M CS resources, a BS and a UE may index the CS resources. Thereafter, if a starting index and a gap are configured, the UE may consider that with respect to the starting index, L CS resources with indices of p*Gap for $p=0, 1, \ldots, L-1$ are allocated for an SEQ-PUCCH.

The above-described sixth sequence/sequence group/CS hopping supporting method may be applied together with other proposed methods of the present disclosure unless they collide with each other.

3.7. Seventh Sequence/Sequence Group/CS Hopping Supporting Method

In the following, it is assumed that one sequence resource set includes N base sequences and M CSs can be applied to each base sequence. In this case, if resources in the sequence resource set are used for UCI on a specific UL channel or a DM-RS transmission sequence, an operation of changing a base sequence per specific time resource unit is named 'base sequence hopping', and an operation of changing a (applied) CS per specific time resource unit is named 'CS hopping'. In addition, an operation of changing a Time Domain Orthogonal Cover Code (TD-OCC) applied to the UCI on the specific UL channel or a DM-RS is named 'OCC hopping'.

According to the present disclosure, when a BS indicates a specific initial CS index for the CS hopping pattern, the initial CS index may be used as input for the CS hopping pattern. In this case, the initial CS index may mean a UE-specific CS offset value added to a cell-specific CS hopping pattern.

In a case where the base sequence hopping, CS hopping, or TD-OCC hopping is applied to a UL physical channel (e.g., PUCCH, PUSCH, etc.) where frequency hopping in a slot can be enabled or disabled, at least one of the following parameters may be used as input for the base sequence hopping pattern, CS hopping pattern, or TD-OCC hopping pattern.

(1) Slot Index
(2) OFDM Symbol Index
 The OFDM symbol index may mean an OFDM symbol index fixed for the slot (regardless of the transmission period of the UL physical channel).
(3) Frequency Hop Index
 The frequency hop index may mean an index sequentially allocated to each hop when the frequency hopping is enabled (for example, indices of 0, 1, 2, . . . , K−1 are allocated to K hops). If the frequency hopping is disabled, the frequency hop index may be assumed to be 0. Alternatively, the frequency hop index may be determined by assuming that the frequency hop index assigned to a corresponding hop is still applied to a time period (or symbols) corresponding to each hop (when the frequency hopping is applied).

For example, in the case of the base sequence hopping pattern applied to a (sequence-selection-based or sequence modulation) PUCCH or a PUCCH/PUSCH DM-RS, a physical cell ID or an ID configured by the BS may be used as a seed value, and a slot index may be used as an additional input value (that is, each slot has a different base sequence).

Similarly, in the case of the CS hopping pattern, a physical cell ID or an ID configured by the BS may be used as a seed value, and a slot index and/or an OFDM symbol index may be used as an additional input value (that is, each symbol has a different CS).

On the other hand, the OCC hopping pattern may be valid only within a slot. Thus, the frequency hop index may be used as input for the OCC hopping pattern (that is, each frequency hop (or a virtual time period corresponding to each frequency hop) has a different OCC).

Additionally, the above-described seventh sequence/sequence group/CS hopping supporting method may be similarly applied to UCI or data scrambling in terms of interference randomization. That is, if the UCI or data scrambling is applied to a UL physical channel (e.g., PUCCH, PUSCH) where the frequency hopping is enabled or disabled in a slot, at least one of the following values may be used as input for a scrambling function.

1) Slot Index
2) OFDM Symbol Index
 The OFDM symbol index may mean an OFDM symbol index fixed for the slot (regardless of the transmission period of the UL physical channel).
3) Frequency Hop Index
 The frequency hop index may mean an index sequentially allocated to each hop when the frequency hopping is enabled (for example, indices of 0, 1, 2, . . . , K−1 are allocated to K hops). If the frequency hopping is disabled, the frequency hop index may be assumed to be 0. Alternatively, the frequency hop index may be determined by assuming that the frequency hop index assigned to a corresponding hop (when the frequency hopping is applied) is still applied to a time period (or symbols) corresponding to each hop.

The above-described seventh sequence/sequence group/CS hopping supporting method may be applied together with other proposed methods of the present disclosure unless they collide with each other.

Figure 16:
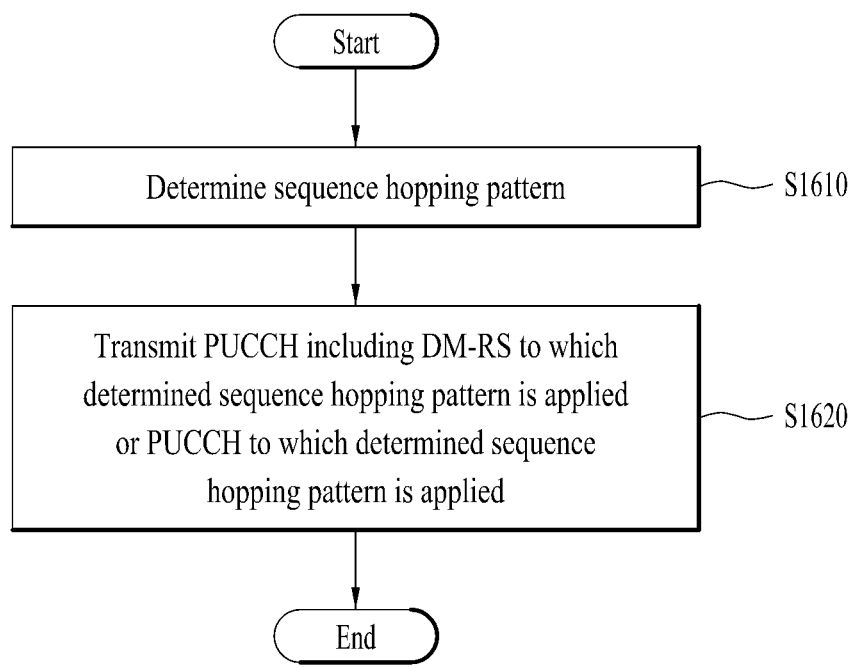
FIG. 16 is a flowchart illustrating a PUCCH transmission method performed by a user equipment according to the present disclosure.

FIG. 16 is a flowchart illustrating a PUCCH transmission method performed by a UE according to the present disclosure.

First, the UE determines a sequence hopping pattern based on frequency hop index determined depending on whether frequency hopping is configured in a slot (S1610). Subsequently, the UE transmits a first PUCCH including a DM-RS to which the determined sequence hopping pattern is applied or a second PUCCH to which the determined sequence hopping pattern is applied (S1620).

For example, when the frequency hopping is configured in the slot, the frequency hop index may be sequentially numbered from 0 to N (where N is a natural number) for hops in the slot.

Specifically, when the frequency hopping is applied in the slot, there may be distinguished a first hop with a symbol length of ceiling ($N_{PUCCH,symb}/2$) and a second hop with a symbol length of $N_{PUCCH,symb}$−ceiling ($N_{PUCCH,symb}/2$), depending on the symbol length of a PUCCH ($N_{PUCCH,symb}$).

As another example, when the frequency hopping is not configured in the slot, the frequency hop index may be configured to be 0.

In this case, the sequence hopping pattern may be determined based on a combination of a sequence group hopping pattern for selecting one sequence group from among a plurality of sequence groups and a base sequence hopping pattern for selecting one base sequence from among a plurality of base sequences in a specific sequence group.

According to the present disclosure, the sequence hopping pattern may be determined based on a slot index as well as the frequency hop index.

In particular, as described above, the absolute time length corresponding to the one slot may be configured differently depending on applied numerology. Accordingly, an absolute time unit to which the sequence hopping pattern is applied may be configured differently depending on the applied numerology.

Since each of the examples of the proposed methods may be included as a method for implementing the present disclosure, it is apparent that each example may be regarded as a proposed method. In addition, although the proposed methods may be implemented independently, some of the proposed methods may be combined (or merged) for implementation. Moreover, a rule may be defined as follows: information on whether the proposed methods are applied (or information on rules related to the proposed methods) should be transmitted from a BS to a UE through a predefined signal (e.g., a physical layer signal, a higher layer signal, etc.).

4. Device Configuration

Figure 17:
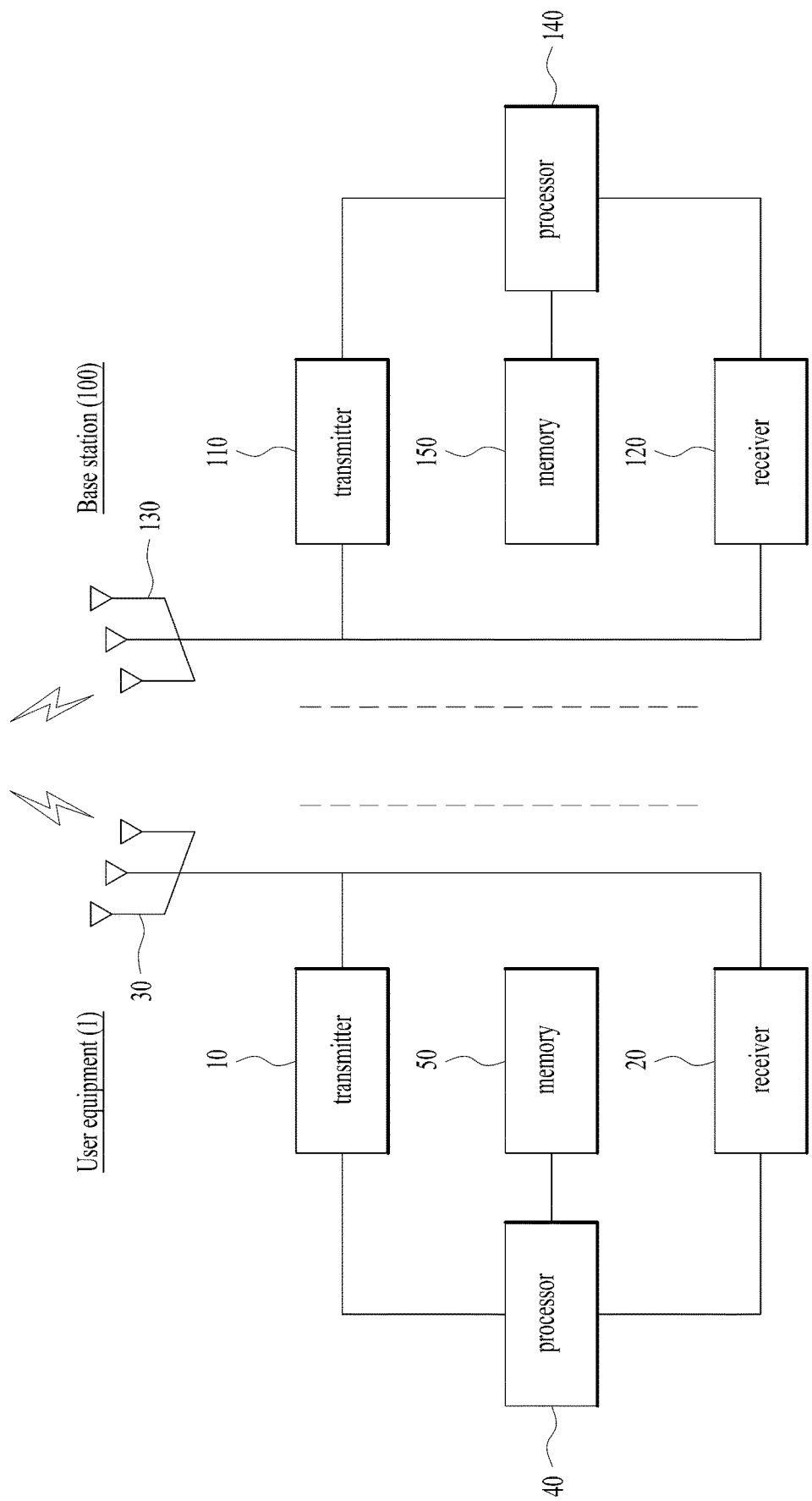
FIG. 17 is a diagram illustrating the configurations of a user equipment and a base station for implementing the proposed embodiments.

FIG. 17 illustrates the configurations of a UE and a BS for implementing the proposed embodiments. The UE and BS illustrated in FIG. 17 operate to implement the embodiments of the above-described PUCCH transmission and reception method between a UE and a BS.

The UE 1 may act as a transmission end in uplink and a reception end in downlink. The BS (eNB or gNB) 100 may act as a reception end in uplink and a transmission end in downlink.

Each of the UE and BS may include a transmitter 10/110 and a receiver 20/120 for controlling transmission and reception of information, data, and/or messages and an antenna 30/130 for transmitting and receiving information, data, and/or messages.

In addition, each of the UE and BS may include a processor 40/140 for implementing the above-described embodiments of the present disclosure and a memory 50/150 for temporarily or permanently storing operations of the processor 40/140.

With the above-described configuration, the UE 1 determines, through the processor 40, a sequence hopping pattern based on frequency hop index determined depending on whether frequency hopping is configured in a slot. Subsequently, the UE 1 transmits, through the transmitter 10, a first PUCCH including a DM-RS to which the determined sequence hopping pattern is applied or a second PUCCH to which the determined sequence hopping pattern is applied.

The BS 100 receives, from the UE 1 through the receiver 120, a first PUCCH including a DM-RS to which a specific sequence hopping pattern is applied or a second PUCCH to which the specific sequence hopping pattern is applied. In this case, the specific sequence hopping pattern may be determined based on frequency hop index determined depending on whether frequency hopping is configured in a slot.

The transmitter and receiver of each of the UE and BS may perform packet modulation/demodulation for data transmission, high-speed packet channel coding, OFDMA packet scheduling, TDD packet scheduling, and/or channel multiplexing. Each of the UE and BS of FIG. 17 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

The embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of transmitting a Physical Uplink Control Channel (PUCCH) signal by a user equipment (UE) in a wireless communication system, the method comprising:
    generating the PUCCH signal based on sequence information and cyclic shift information applied to the sequence information,
    wherein the sequence information is determined in a hop unit included in time resources for transmission of the PUCCH signal, based on a combination of (i) a frequency hop index and (ii) slot information related to the time resources,
    wherein the cyclic shift information is determined in a symbol unit included in the time resources, based on a combination of (i) the slot information related to the time resources and (ii) related symbol information; and
    transmitting the generated PUCCH signal to a base station,
    wherein the frequency hop index is determined based on an intra-slot frequency hop configuration,
    wherein based on frequency hopping being enabled in a slot, the frequency hop index is sequentially numbered for hops in the slot, and
    wherein based on the frequency hopping being disabled in the slot, the frequency hop index is equal to 0.

2. The method of claim 1, wherein based on the frequency hopping being enabled in the slot, the frequency hop index is sequentially numbered from 0 to N (where N is a natural number) for hops in the slot.

3. The method of claim 1, wherein an absolute time unit to which the sequence hopping pattern is applied is configured differently according to applied numerology.

4. The method of claim 1, wherein the slot comprises 14 symbols.

5. The method of claim 1, wherein the slot corresponds to a basic unit of scheduling.

6. The method of claim 1, wherein the sequence information is determined independently in the unit of hop.

7. The method of claim 6, wherein the sequence information identifies a base sequence applied in the unit of hop.

8. The method of claim 1, wherein the cyclic shift information is determined independently in the unit of symbol.

9. The method of claim 8, wherein the unit of symbol corresponds to a unit of orthogonal frequency division multiplexing (OFDM) symbol.

10. A method of receiving a Physical Uplink Control Channel (PUCCH) signal from a user equipment (UE) by a base station in a wireless communication system, the method comprising:
   receiving, from the UE, the PUCCH signal generated based on sequence information and cyclic shift information applied to the sequence information,
   wherein the sequence information is determined in a hop unit included in time resources for transmission of the PUCCH signal, based on a combination of (i) a frequency hop index and (ii) a slot information related to the time resources,
   wherein the cyclic shift information is determined in a symbol unit included in the time resources, based on a combination of (i) the slot information related to the time resources and (ii) related symbol information,
   wherein the frequency hop index is determined based on an intra-slot frequency hop configuration,
   wherein based on frequency hopping being enabled in a slot, the frequency hop index is sequentially numbered for hops in the slot, and
   wherein based on the frequency hopping being disabled in the slot, the frequency hop index is equal to 0.

11. A user equipment (UE) for transmitting a physical uplink control channel (PUCCH) signal in a wireless communication system, the UE comprising:
   at least one transmitter and at least one receiver;
   at least one processor; and
   at least one memory operably connectable to the at least one processor and storing instructions that, when executed, cause the at least one processor perform operations comprising:
   generating the PUCCH signal based on sequence information and cyclic shift information applied to the sequence information,
   wherein the sequence information is determined in a hop unit included in time resources for transmission of the PUCCH signal, based on a combination of (i) a frequency hop index and (ii) a slot information related to the time resources,
   wherein the cyclic shift information is determined in a symbol unit included in the time resources, based on a combination of (i) the slot information related to the time resources and (ii) related symbol information; and
   transmitting the generated PUCCH signal to a base station,
   wherein the frequency hop index is determined based on an intra-slot frequency hop configuration,
   wherein based on frequency hopping being enabled in a slot, the frequency hop index is sequentially numbered for hops in the slot, and
   wherein based on the frequency hopping being disabled in the slot, the frequency hop index is equal to 0.

12. The UE of claim 11, wherein the UE communicates with at least one of a mobile terminal, a network and an autonomous vehicle.

* * * * *